(No Model.)

C. G. JONES.
ROAD SCRAPER ATTACHMENT FOR VEHICLES.

No. 339,661. Patented Apr. 13, 1886.

Witnesses:
Eben C. Webster
J. Fred Webster

Inventor:
C. George Jones

UNITED STATES PATENT OFFICE.

C. GEORGE JONES, OF RIPLEY, MAINE.

ROAD-SCRAPER ATTACHMENT FOR VEHICLES.

SPECIFICATION forming part of Letters Patent No. 339,661, dated April 13, 1886.

Application filed August 12, 1885. Serial No. 174,175. (No model.)

*To all whom it may concern:*

Be it known that I, C. GEORGE JONES, a citizen of the United States, residing at Ripley, in the county of Somerset and State of Maine, have invented a new and useful Road-Scraper Attachment for Vehicles; and I do hereby declare that the following is a full, clear, and exact description of the invention, which will enable others skilled in the art to which it appertains to make and use the same.

My invention relates to an improved device for building, scraping, smoothing, and repairing roads, so constructed as to be applied to the running-gear of an ordinary farmer's cart or set of wheels, and detachable therefrom when not in use, and is illustrated in the accompanying drawings, in which—

Figure 1:
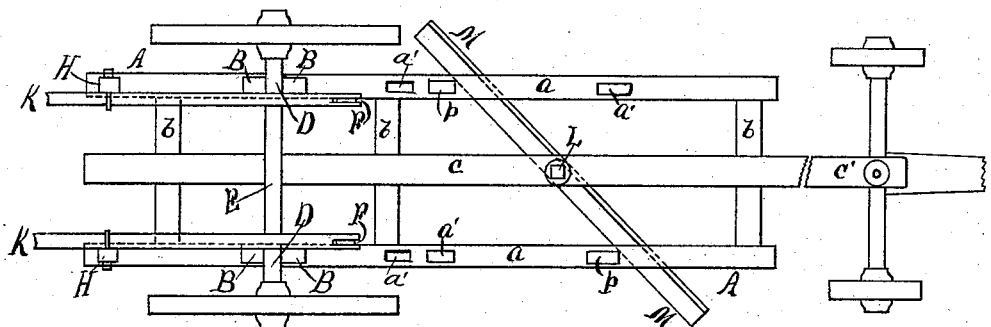
Figure 2:
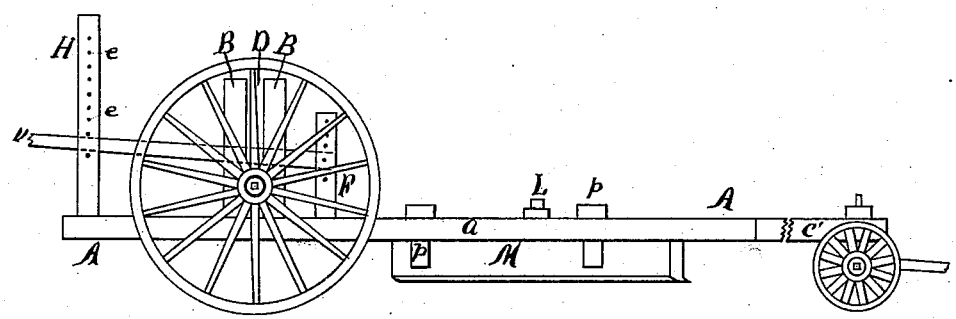

Figure 1 is a top view. Fig. 2 is a side elevation.

Similar letters refer to corresponding parts throughout the figures.

In construction I provide a strong frame, A A, preferably rectangular in shape or tapering forward. The frame is constructed of two side pieces, *a a*, a sufficient number of cross-pieces, *b b b*, and one center piece, *c*, running lengthwise of the frame and rigidly secured to the cross-pieces. The center piece projects forward of the frame sufficiently to clear it from the oblique backward swing of the fore wheels, forming a tongue, *c'*, which is pivotally and removably attached to the forward axle.

Near the rear end and at both sides of the frame I form the rigid double standards B B, substantially perpendicular to the frame, having between them spaces D D, for the reception of the bed E of the rear axle, and at the rear end of the frame and at both sides I form the rigid single standards H H, provided with pin or bolt holes *e e*. The frame is made long enough to project behind the rear axle, as hereinafter explained, and of somewhat less width when connected to the axle than the bed of the axle. Slightly in front of the double standards B B, I pivot to the inner sides of the side pieces of the frame the arms F F, provided at their upper ends with means whereby the levers K K may be pivoted to them at any desired point. I have shown the ends of the levers K K slotted to pass on over the heads of the arms F F, upon which they may be adjusted at any desired point and secured by pins or bolts; but any equivalent means may be adopted.

Upon the bottom of the center piece, *c*, of the frame, and near the forward end of the frame, I pivot upon the bolt L, and permanently secure there, an ordinary scraper, M, which may consist of a piece of timber shod on its forward lower edge with metal, and in each of the side pieces, *a a*, of the frame I provide slots *a' a'*, through which pass pins or stops *p p*, projecting through the bottoms of the side pieces. The scraper M is generally used in a position transverse to the frame, and having been adjusted in position the stops *p p* are inserted in the slots corresponding to the position of the scraper, the back edge of which bears upon said stops, and the scraper is thus locked and held in any desired position.

In operation the tongue *c'* of the center piece, *c*, is pivotally attached to the forward axle, and the rear axle is inserted into the spaces D D, between the double standards B B. The levers K K are pressed down upon the rear axle, E, as a fulcrum, and, lifting the frame and scraper clear of the ground, are secured at any desired position on the single standards H H, by means of pins inserted over the levers in the pin-holes *e e*. The scraper M is then swung upon the bolt L and adjusted, in the manner before stated, at any convenient angle, and the machine is ready for operation.

If, on account of the nature of the work to be done, the conformation of the ground, or inequalities or obstructions upon its surface, it becomes desirable or necessary to raise or depress either end of the scraper, this result may be effected by raising or depressing the lever on the side where the change in elevation of the scraper is required.

If by reason of the height of any particular set of fore wheels the scraper should be raised too far from the ground, the frame of my device may be formed without a tongue to the center piece, and a false tongue may be hinged to the top of the center piece, to the rear of the forward end of the frame, and stiffened and prevented from lateral motion by a spear or brace passed through it and the center piece, and the false tongue may be pivotally attached to the fore axle, as before.

Having thus described my invention, what I claim, and desire to secure by Letters Patent, is—

The combination, with a four-wheeled vehicle or set of four wheels, of the herein-described scraper attachment consisting of a body or frame having a projecting center piece or tongue, a scraper pivotally and permanently secured to its under side, adjustable at various angles to the frame, and capable of being locked at various angles by stops passing downward through the side pieces of the frame, or in any equivalent manner, rigid upright double standards on each side and near the rear end of said frame, two arms pivoted to the side pieces of the frame in front of said double standards, two levers adjustably pivoted to said arms, two rigid upright single standards at the rear end of the frame behind the double standards, and so placed that the ends of the levers may be secured upon the single standards at various and different elevations, all as shown and described, and substantially as and for the purpose specified.

C. GEORGE JONES.

Witnesses:
EBEN C. WEBSTER,
J. FRED WEBSTER.